Aug. 8, 1961     D. J. CLARKE ET AL     2,995,338
BLADED ROTORS FOR COMPRESSORS, TURBINES AND THE LIKE
Filed March 11, 1959
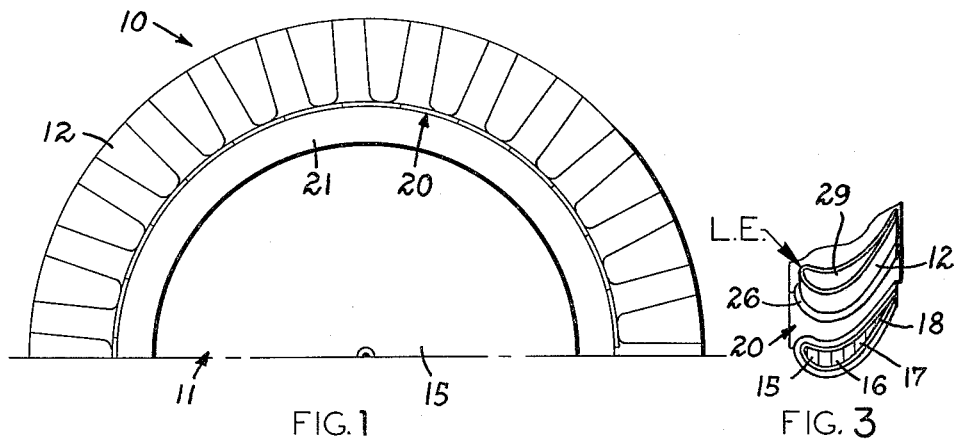
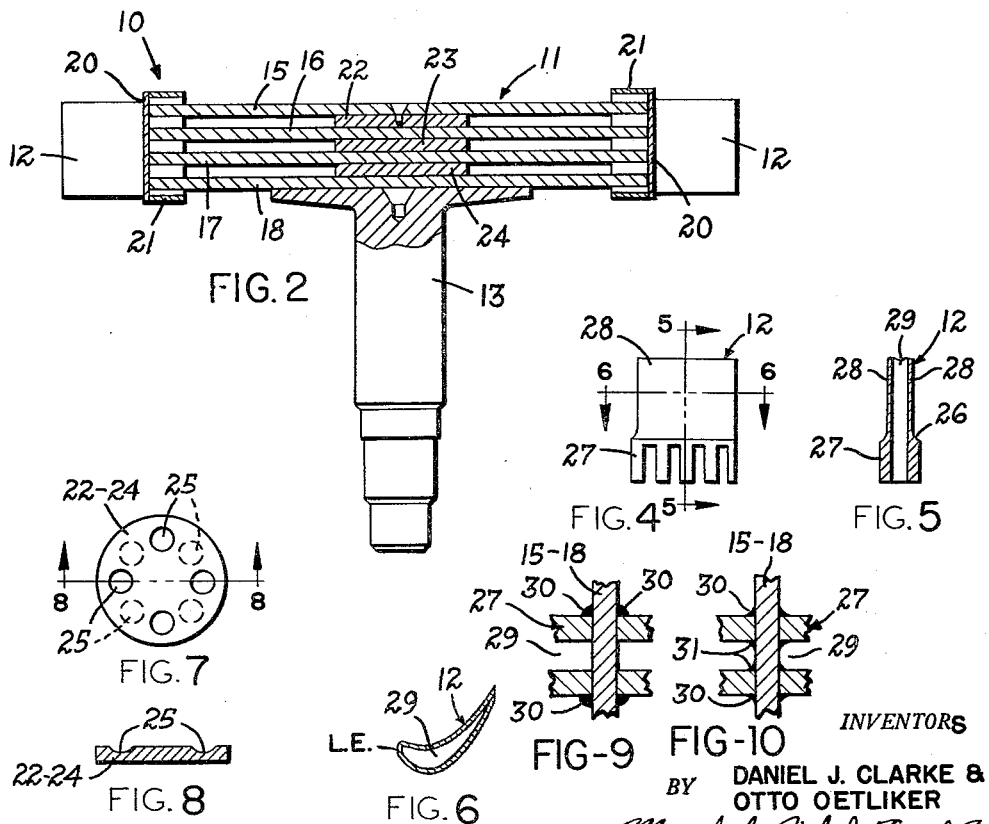
INVENTORS
DANIEL J. CLARKE &
OTTO OETLIKER
BY
ATTORNEYS United States Patent Office 2,995,338
Patented Aug. 8, 1961

2,995,338
BLADED ROTORS FOR COMPRESSORS, TURBINES AND THE LIKE
Daniel J. Clarke and Otto Oetliker, Essexville, Mich., assignors to The Stalker Corporation, Essexville, Mich., a corporation of Michigan
Filed Mar. 11, 1959, Ser. No. 798,623
4 Claims. (Cl. 253—77)

This invention relates to bladed rotors for compressors, turbines, and the like.

An object of the invention is to provide an economical bladed rotor which can be operated at extremely high tip speeds or rates of rotation.

Another object is to provide such a rotor having hollow wrought metal blades so fixed in the rotor that it can operate at extremely high rates of rotation.

A further object is to provide a brazed composite rotor which can be visually inspected.

Another object is to provide a rotor having sheet metal parts making up the blade and disk assembly.

Still another object is to provide hollow blades which if they were to fly apart would have little penetrating power because they would crumple relatively easily.

Other objects will appear from the specification, accompanying claims, and appended drawings.

It is quite difficult to provide a light weight turbine rotor which can rotate at its highest possible no load speed, or one approximating this magnitude, while retaining its structural integrity. Solid blades present such high centrifugal loads that they burst apart at their roots, or their attachment means to the hub or disk fails. Attempts have been made to overcome the latter failure by making the solid blades integral with the rotor hub or disk. These result in costly and heavy rotors whose hubs or disks are subject to bursting because of the heavy blades and rotor hub rims.

The subject invention provides hollow blades of thin wrought or worked material such as sheet metal which are light weight and strong enough to sustain the centrifugal forces. However they present a difficult problem of attachment in the rotor. The method of attachment should provide a generous fillet at the junction of the blade walls and the rim surface of the hub so that the blade will resist fatigue failure from vibration. In the same instance the rotor hub must retain its ability to sustain peripheral stress at the attachment of the blades and thus preclude any possibility of bursting.

These problems of the fillet and a light weight attachment are solved coincidentally by the present invention. Each blade wall increases in thickness by a fillet surface at the rotor rim so that the fillet surface fairs with the rim surface. The thickened root portion of the blade passes inward through the rim means and has a plurality of slots in the blade, each slot receiving a portion of a disk therein. High temperature solder at each slot bonds the blade to each disk of which there are a plurality arranged axially in series. The disks thus are formed with peripheral portions which are continuous, that is, free from slots and the like. The plurality of disks and the thickened root portion provide sufficient braze area in shear to sustain each blade against the large centrifugal forces. Furthermore the plurality of brazed joints of small width provide for more certain joints since the solder has only a short distance to flow from one side of the blade wall to the other; and inspection can be visual since if the solder flows from one side to the other over a short distance and presents a good or complete fillet at the other side, the joint can be considered sound. These fillets of the joints of the disks can be viewed through the open ends of the hollow blades.

It will now be clear that the novel combination of parts of special proportions presents a solution to the several problems which must be solved coincidentally to achieve a strong turbine rotor.

The above objects are accomplished by the means illustrated in the accompanying drawings in which—

FIG. 1 is a fragmentary axial view of a rotor according to the present invention;

FIG. 2 is a radial view of the rotor partially in section;

FIG. 3 is a fragmentary radial view of a blade and its neighboring blade;

FIG. 4 is a side elevation of a blade isolated from the rotor;

FIG. 5 is a vertical section on line 5—5 of FIG. 4;

FIG. 6 is a horizontal section on line 6—6 of FIG. 4;

FIG. 7 is an axial view of a spacer disk isolated from the rotor;

FIG. 8 is a section on line 8—8 of FIG. 7; and

FIGS. 9 and 10 are enlarged sectional views through the junction between the blade root and the disk before and after brazing.

Referring now to the drawings, the rotor for a turbine is indicated generally by 10. It comprises the hub means 11, the blades 12 and the shaft 13. The hub means comprises the series of axially spaced blade supporting disks 15–18, the rim means comprising separate segments 20 between the blades and continuous ring shaped flanges 21 at either side of the segments and brazed thereto and the spacer disks 22–24 alternating with the disks 15–18, and preferably of axial thickness comparable thereto, all brazed together. The spacer disks have a series of depressions 25 on opposite sides thereof to receive the brazing material therein (FIGS. 7 and 8).

The rim means 20 is in the form of rim segments between blades extending from blade to blade and from front to rear of the blades whose leading edges are indicated by L.E. These segments are preferably fixed to the peripheral edges of the blade supporting disks 15–18 by brazing with high temperature solder and are similarly bonded to the side walls of the blades.

The main body of the hollow blades above the rim is acted upon by the motive gases for turning the turbine rotor. The walls of the blades increase in thickness at the rim along a curved fillet surface 26 providing a thickened root portion 27 which passes through the rim as shown in FIG. 5.

The root portion 27 is thickened and slotted. Each slot receives the radial outer portion of a supporting disk and is bonded thereto by fused metal, preferably a brazing alloy. The blades have very thin walls 28 above fillets 26 so that in the case of an accident a blade thrown off the rotor will readily crumple upon hitting a shield about the turbine and will not pierce it readily.

The blade roots 27 are slotted so that the disks 15–18 can be peripherally continuous through the blade roots. This enables the disks to retain high strength. A circular hole for instance, in a rotating disk, doubles the stress adjacent the hole. A rotor which is running away as a result of losing its power load will attain high rates of rotation and consequently high stresses will develop which will cause most rotors to burst. The rotor of the present invention can attain runaway speeds while retaining its integrity. This is largely due to the hollow blades, and the means of attachment thereof to the disks through brazing the whole assembly together.

The exterior joints between the blades and the outer peripheries of the disks can be inspected visually. If brazing alloy is placed at the one side of the disk periphery at the junction with the blade it will be melted and flow through between the two during the brazing operation. The presence of a fillet at the other side of the disk will indicate a valid brazed joint. This is indicated in FIGS. 9 and 10, the former showing the brazing material applied initially at 30 on one side of the blade roots, while FIG. 10 shows the condition after brazing with the solder having passed through the joint and forming fillets 31 on the opposite sides of the blade and fairing with the disk. These joints may be observed by viewing radially inward through the open ends of the blades, as well as by viewing radially outward along the sides of the outer disks 15 and 18 looking toward the inner periphery of the rim means. The other joints may be treated similarly with braze alloy and when viewed through the open tip end 29 of the blade will show a fillet on the opposite side of the disk from where the alloy was placed if a successful braze joint is present.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. In combination in a bladed rotor for exchanging energy with an elastic fluid, hub means including a plurality of axially spaced disks fixed together, said disks being continuous from their peripheries over a substantial extent of their side faces radially inward thereof, a plurality of hollow blades peripherally spaced about said disks, rim means extending about the periphery of said disks between adjacent blades and from front to rear thereof, each said blade having walls increasing in thickness at said rim means by a fillet surface fairing with the radially outer surface of said rim means and defining a thickened root portion, said root portions extending through said rim means and having a plurality of chordwise spaced slots therein with each slot receiving said continuous portions of said disks therein and in contacting relation with said side faces thereof, and high temperature solder bonding each disk to said blade over said side faces constituting the support for said blades.

2. In combination in a bladed rotor for exchanging energy with an elastic fluid, hub means including a plurality of axially spaced blade supporting disks fixed together by means of spacer disks of lesser diameter, said disks being continuous from their peripheries over a substantial extent of their side faces radially inward thereof, a plurality of hollow blades peripherally spaced about said disks, rim means extending about the periphery of said blade supporting disks between adjacent blades and from front to rear thereof, each said blade having walls increasing in thickness at said rim means by a fillet surface fairing with the radially outer surface of said rim means and defining a thickened root portion, said root portions extending through said rim means and having a plurality of chordwise spaced slots therein with each slot receiving said continuous portions of said disks therein and in contacting relation with said side faces thereof, and high temperature solder bonding each said blade supporting disk over said side faces constituting the support for said blades.

3. In combination in a bladed rotor for exchanging energy with an elastic fluid, hub means including a plurality of axially spaced disks fixed together, said disks being continuous from their peripheries over a substantial extent of their side faces radially inward thereof, a plurality of hollow blades peripherally spaced about said disks, segmental rim means secured to the periphery of said disks and extending between adjacent blades and from front to rear thereof, each said blade having walls increasing in thickness at said rim means by a fillet surface fairing with the radially outer surface of said rim means and defining a thickened root portion, said root portions extending radially inward of said rim means and having a plurality of chordwise spaced slots therein with each slot receiving said continuous portions of said disks therein and in contacting relation with said side faces thereof, and high temperature solder bonding each disk to said blade over said side faces constituting the support for said blades.

4. In combination in a bladed rotor for exchanging energy with an elastic fluid, hub means including a plurality of axially spaced disks fixed together, said disks being continuous from their peripheries over a substantial extent of their side faces radially inward thereof, a plurality of hollow blades peripherally spaced about said disks, rim means extending about the periphery of said disks between adjacent blades and from front to rear thereof, each said blade having walls increasing in thickness at said rim means by a fillet surface fairing with the radially outer surface of said rim means and defining a thickened root portion, said root portions extending through said rim means and having a plurality of chordwise spaced slots therein with each slot receiving said continuous portions of said disks therein and in contacting relation with said side faces thereof, and high temperature solder bonding each disk to said blade over said side faces constituting the support for said blades, said blades being open from the tip to the root portion thereof providing for visual inspection of said brazed fillets.

References Cited in the file of this patent
UNITED STATES PATENTS

| | | |
|---|---|---|
| 822,801 | Wilkinson | June 5, 1906 |
| 2,613,058 | Atkinson | Oct. 7, 1952 |
| 2,625,366 | Williams | Jan. 13, 1953 |
| 2,648,520 | Schmitt | Aug. 11, 1953 |